United States Patent
Sohn

(10) Patent No.: US 8,835,036 B2
(45) Date of Patent: Sep. 16, 2014

(54) BATTERY PACK

(75) Inventor: Kwon Sohn, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 302 days.

(21) Appl. No.: 13/067,290

(22) Filed: May 23, 2011

(65) Prior Publication Data

US 2012/0156541 A1    Jun. 21, 2012

(30) Foreign Application Priority Data

Dec. 21, 2010 (KR) .................. 10-2010-0131761

(51) Int. Cl.
| | |
|---|---|
| *H01M 10/50* | (2006.01) |
| *H01M 10/6557* | (2014.01) |
| *H01M 10/647* | (2014.01) |
| *H01M 10/625* | (2014.01) |
| *H01M 10/0525* | (2010.01) |
| *H01M 10/643* | (2014.01) |
| *H01M 10/613* | (2014.01) |
| *H01M 10/6555* | (2014.01) |

(52) U.S. Cl.
CPC ...... *H01M 10/5004* (2013.01); *H01M 10/5059* (2013.01); *H01M 10/5032* (2013.01); *Y02T 10/7011* (2013.01); *H01M 10/5016* (2013.01); *H01M 10/0525* (2013.01); *Y02E 60/122* (2013.01); *H01M 10/503* (2013.01); *H01M 10/5055* (2013.01)
USPC ...................................................... 429/120

(58) Field of Classification Search
USPC .................. 429/120; 165/185, 80.1–80.5; 257/712–721; 361/676, 831
See application file for complete search history.

(56) References Cited

U.S. PATENT DOCUMENTS

| | | | |
|---|---|---|---|
| 4,048,400 A  * | 9/1977 | White ........................... | 429/160 |
| 5,456,994 A | 10/1995 | Mita | |
| 5,589,290 A  * | 12/1996 | Klink et al. ..................... | 429/99 |
| 5,639,571 A  * | 6/1997 | Waters et al. ................... | 429/71 |
| 6,709,783 B2 * | 3/2004 | Ogata et al. .................... | 429/120 |
| 7,795,845 B2 * | 9/2010 | Cho ................. | 320/150 |
| 2006/0286442 A1* | 12/2006 | Flaugher ......................... | 429/99 |
| 2009/0186265 A1* | 7/2009 | Koetting et al. ............. | 429/120 |
| 2009/0208829 A1* | 8/2009 | Howard et al. .............. | 429/120 |
| 2010/0103620 A1 | 4/2010 | Campbell et al. | |
| 2012/0219838 A1* | 8/2012 | Terada et al. ................. | 429/120 |

FOREIGN PATENT DOCUMENTS

| | | |
|---|---|---|
| JP | 05-343105 A | 12/1993 |
| JP | 5343105 A | 12/1993 |
| JP | 10-321890 | * 12/1998 |
| JP | 2000-243461 A | 9/2000 |
| JP | 2010-226025 A | 10/2010 |
| KR | 1998-0044142 | 9/1998 |
| KR | 10-2009-0114964 A | 11/2009 |
| KR | 10-2010-0045376 A | 5/2010 |
| KR | 10-2010-0081674 A | 7/2010 |

* cited by examiner

*Primary Examiner* — Ula C Ruddock
*Assistant Examiner* — Lisa S Park Gehrke
(74) *Attorney, Agent, or Firm* — Lee & Morse, P.C.

(57) ABSTRACT

A battery pack including at least one battery module having a plurality of battery cells aligned in one direction; a heat conductive member in contact with bottom surfaces of the battery cells, the heat conductive member including porous plates, and guide members spaced apart from the porous plates in an interior of the heat conductive member, the guide members defining flow paths for directing coolant between the porous plates; and a housing accommodating the at least one battery module and the heat conductive member.

16 Claims, 3 Drawing Sheets

BATTERY PACK

BACKGROUND

1. Field

Embodiments relate to a battery pack.

2. Description of the Related Art

In general, secondary batteries are rechargeable for repeated use. The secondary batteries may constitute a battery cell to be used in a portable small-sized electronic device, e.g., a cellular phone, laptop computer, desktop computer, camera, and/or camcorder. Alternatively, the secondary batteries may constitute a battery pack including a plurality of battery cells to be used as a power source for motor driving, e.g., a high-power hybrid electric vehicle (HEV) or electric vehicle (EV).

As described above, the battery pack may be used as a high-power power source for motor driving. Thus, a large amount of heat may be generated by a charging or discharging operation. Therefore, the battery cells may be deteriorated by the heat. Accordingly, it may be desirable to develop a battery pack provided with a structure having enhanced thermal dissipation characteristics.

SUMMARY

Embodiments are directed to a battery pack.

The embodiments may be realized by providing a battery pack including at least one battery module having a plurality of battery cells aligned in one direction; a heat conductive member in contact with bottom surfaces of the battery cells, the heat conductive member including porous plates, and guide members spaced apart from the porous plates in an interior of the heat conductive member, the guide members defining flow paths for directing coolant between the porous plates; and a housing accommodating the at least one battery module and the heat conductive member.

The heat conductive member may further include heat conductive plates, the heat conductive plates being alternately disposed between the porous plates.

A position of the porous plates may correspond to a position of the at least one battery module.

The porous plates may be disposed under the at least one battery module.

The heat conductive plates may include a groove portion therein, the groove portion directing a flow of the coolant between the porous plates.

The groove portion may be formed in at least one surface of the heat conductive plates, the at least one surface facing the at least one battery module or facing away from the at least one battery module.

The porous plate may be made of a heat conductive material having micro-pores.

The porous plate having the micro-pores may be a sintered metallic material.

The heat conductive plate may be made of a metallic material.

The battery pack may include a plurality of battery modules, the battery modules being accommodated in the housing such that sides of the battery cells of one of the battery modules face sides of the battery cells of another of the battery modules.

The heat conductive member may further include at least one through-hole portion.

The through-hole portion may include a first through-hole portion and a second through-hole portion, the first through-hole portion may be an inlet through which the coolant for cooling the battery cells flows into the heat conductive member, and the second through-hole portion may be an outlet through which the coolant in the heat conductive member is discharged to an exterior of the heat conductive member.

The first and second through-hole portions may be disposed at diagonally opposite ends of the heat conductive member.

One end of the second through-hole portion may be aligned with an outer edge of the heat conductive member.

The coolant may be a fluid.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
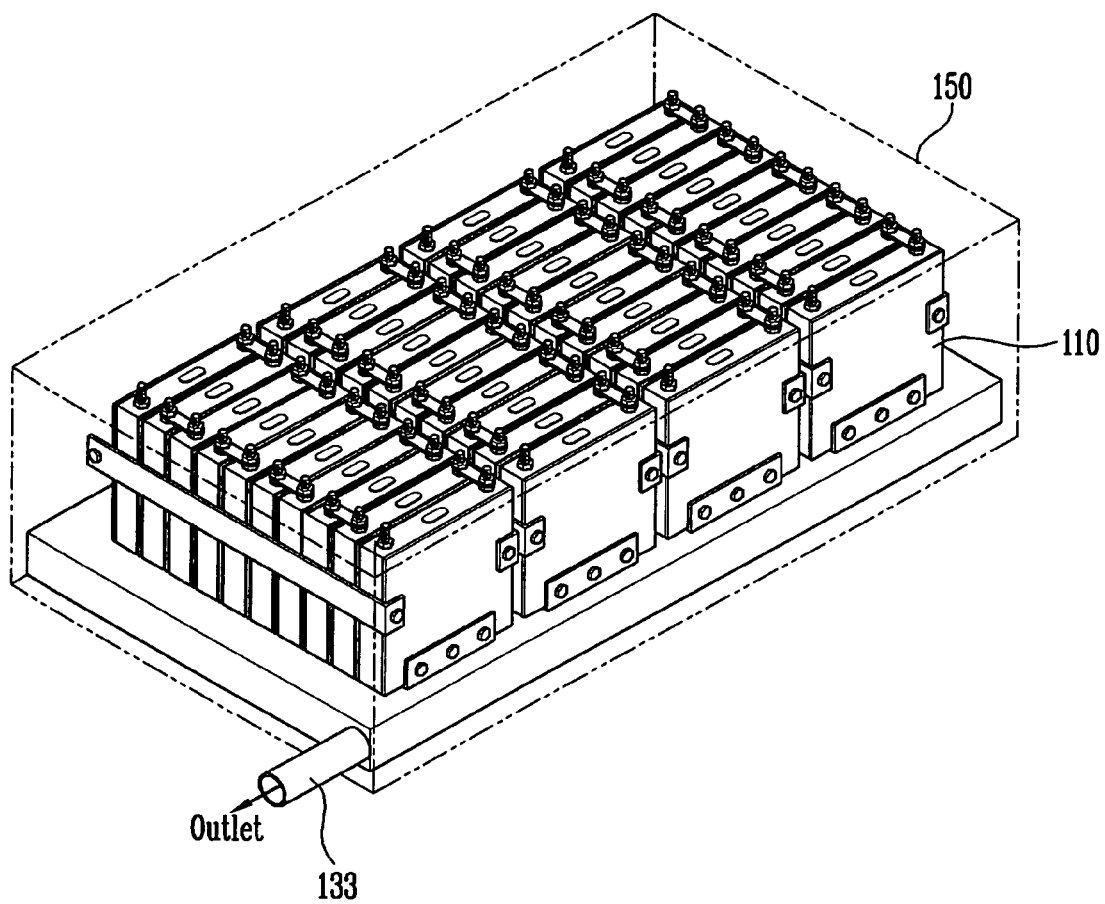
FIG. 1 illustrates a perspective view schematically showing a battery pack according to an embodiment.

Korean Patent Application No. 10-2010-0131761, filed on Dec. 21, 2010, in the Korean Intellectual Property Office, and entitled: "Battery Pack" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

Also, when an element is referred to as being "connected to" another element, it can be directly connected to the other element or be indirectly connected to the another element with one or more intervening elements interposed therebetween.

Figure 2:
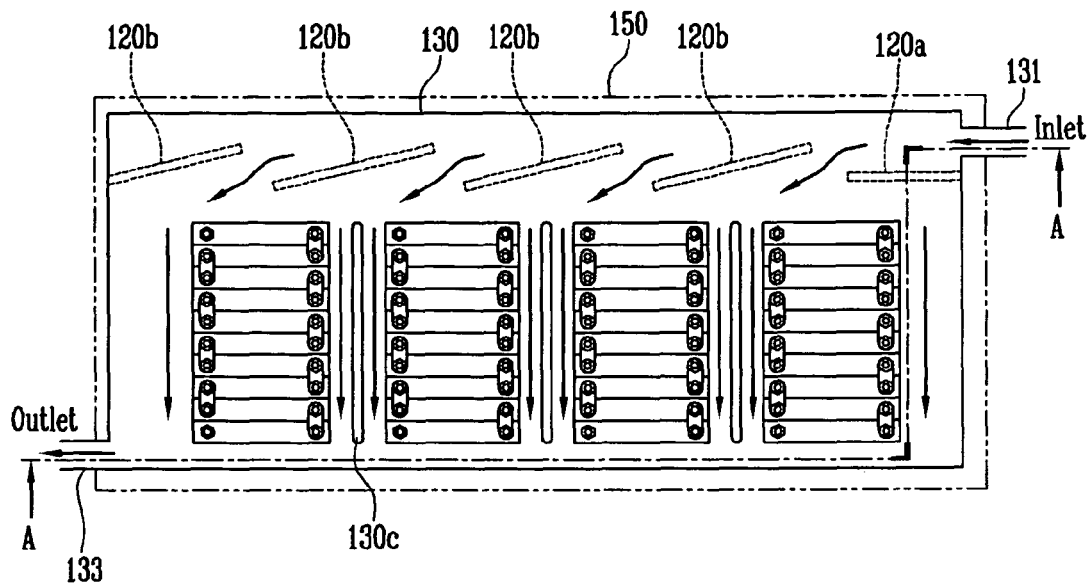
FIG. 2 illustrates a plan view of FIG. 1.
Figure 3:
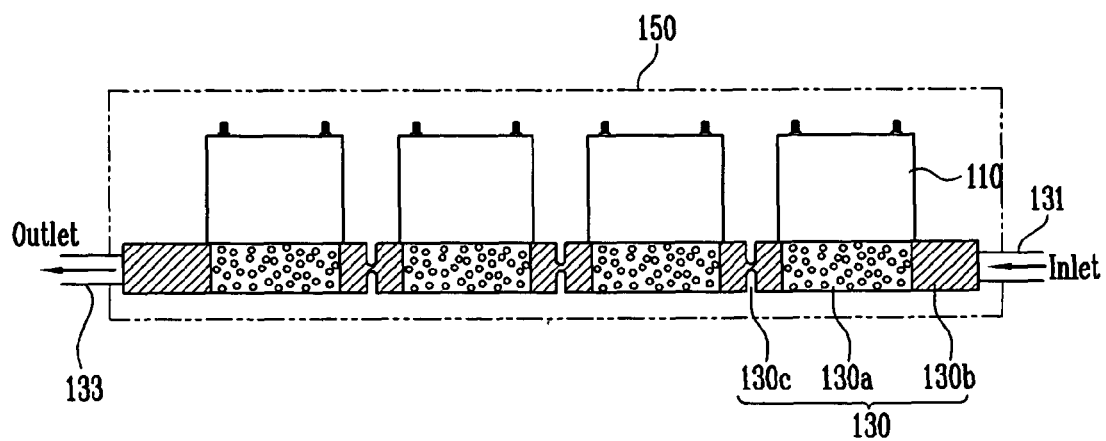
FIG. 3 illustrates a sectional view taken along line A-A' of FIG. 2.
Figure 4:
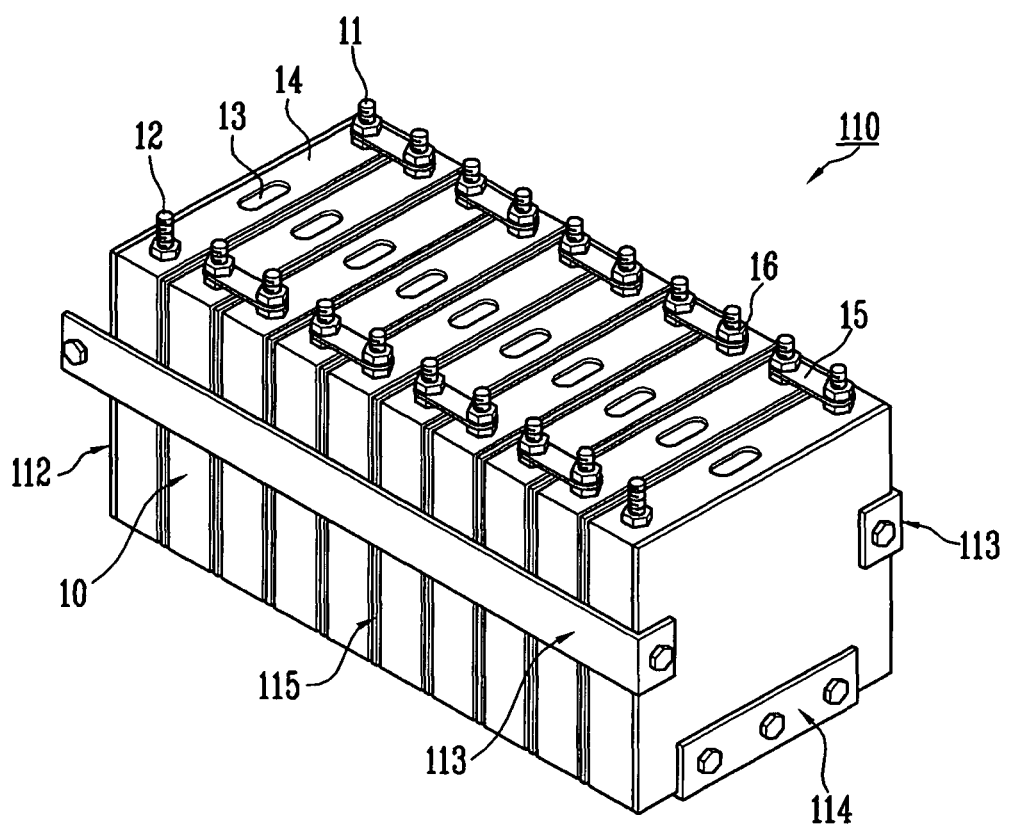
FIG. 4 illustrates a perspective view showing a battery module included in the battery pack of FIG. 1.

FIG. 1 illustrates a perspective view schematically showing a battery pack according to an embodiment. FIG. 2 illustrates a plan view of FIG. 1. FIG. 3 illustrates a sectional view taken along line A-A' of FIG. 2. FIG. 4 illustrates a perspective view showing a battery module included in the battery pack of FIG. 1.

Referring to FIGS. 1 to 3, the battery pack 100 according to the present embodiment may include at least one battery module 110 (having a plurality of battery cells 10 aligned in one direction); a heat conductive member 130 (in contact with bottom surfaces of the battery modules 110 and including porous plates 130a and guide members 120a and 120b spaced apart from the porous plates 130a and forming flow paths for coolant between adjacent porous plates 130a); and a housing 150 accommodating the battery modules 110 and the heat conductive member 130. In an implementation, convection type cooling may be implemented using thermal dissipation fins, thermal dissipation pipes, and/or the porous members or plates 130a.

The housing 150 may accommodate one or more battery modules 110. When the battery pack 100 includes a plurality of battery modules 110, the battery modules 110 may be aligned so that sides of the battery cells 10 of one of the battery modules 110 face sides of the battery cells 10 of another of the battery modules 110.

Generally, heat may be generated by charging and discharging the battery cell 10 several times. The generation of heat may increase a temperature of the battery cell 10. Therefore, in order to maintain performance and stability of the battery cell 10, the heat conductive member 130 (that contacts the battery modules 110 and includes the porous plates 130a) may be disposed on bottom surfaces of, e.g., under, the battery modules 110. The heat conductive member 130 may also include the guide members 120a and 120b in an interior thereof, spaced apart from the porous plates 130a, and forming flow paths for coolant (as indicated by arrows of FIG. 2) between the adjacent porous plates 130a.

In an implementation, the guide member 120a positioned closest to a first through-hole portion 131 (e.g., an inlet, which will be described later) may be parallel to the porous plate 130a so that coolant flowing through the first through-hole portion 131 may be sufficiently and uniformly introduced into the heat conductive member 130. The guide member 120b spaced apart from one surface of the battery module 110 may be disposed at a predetermined angle with respect to the porous plate 130a so that the flow path of coolant may be directed between adjacent porous plates 130a.

The heat conductive member 130 may include the porous plates 130a and heat conductive plates 130b alternately disposed relative to one another. In an implementation, a position of the porous plate 130a may correspond to a position of the battery module 110. For example, the porous plate 130a may be under, e.g., completely under, the battery module 110. The heat conductive plate 130b may be between the adjacent porous plates 130a. In an implementation, the porous plate 130a may be made of a heat conductive material having micro-pores.

A groove portion 130c (to accommodate the coolant directed thereto by the guide members 120a and 120b) may be further provided in the heat conductive plate 130b. For example, the groove portion 130c may be formed in at least one of a surface facing the battery module 110 and a surface opposite to the surface facing the battery module 110.

The battery modules 110 and the heat conductive member 130 may be accommodated in an interior of the housing 150. The coolant, which may include a fluid for cooling the battery cells 10, may be provided to the battery pack 100 including the battery modules 110. Thus, heat generated from the battery cells 10 in the battery modules 110 may be discharged through the micro-pores in the porous plates 130a directly contacting the battery cells 10. At the same time, the coolant may absorb heat generated from the battery cells 10 along the flow paths formed by the guide members 120a and 120b and the groove portions 130c formed in the heat conductive plates 130b and may then discharged.

The porous plate 130a may be formed of a metallic material having micro-pores formed therein, but the material of the porous plate 130a is not limited thereto. For example, the porous plate 130a may be formed of a sintered metallic material having micro-pores formed at positions of an original binder as a result of compressing a mixture of metal and binder and then sintering the compressed mixture at a melting point of the binder or higher. In an implementation, the heat conductive plate 130b may be formed of a metallic material, but the material of the heat conductive plate 130b is not limited thereto.

The porous plate 130a and the heat conductive plate 130b may be made of a heat conductive material so that heat generated from the battery cells 10 may be easily discharged to an exterior of the heat conductive member 130 in the battery pack 100.

The heat conductive member 130 may include the first through-hole portion 131 and a second through-hole portion 133. In an implementation, the first through-hole portion 131 may be an inlet (through which the coolant may be flowed or introduced into the heat conductive member 130); and the second through-hole portion 133 may be an outlet (through which the coolant may be discharged to an exterior of the heat conductive member 130). For example, the coolant may be introduced into the heat conductive member 130 through the first through-hole portion 131 and may cool the battery modules 110 while circulating in an interior of the heat conductive member 130. Then, the coolant may be discharged to the exterior of the heat conductive member 130 through the second through-hole portion 133.

In order to improve cooling efficiency, the first and second through-hole portions 131 and 133 may be disposed diagonally relative to one another, e.g., at opposite corners of the heat conductive member 130. However, the relation between the positions of the first and second through-hole portions 131 and 133 is not limited thereto. In an implementation, one end of the second through-hole portion 133 may be positioned on a same line as an outline of the heat conductive member 130, e.g., may be aligned with an outer edge of the heat conductive member 130. Thus, the coolant may be discharged without being collected or stagnating at a corner portion of the heat conductive member 130.

As described above, the first through-hole portion 131 may be a portion through which the coolant is introduced into the heat conductive member 130. In the first through-hole portion 131, a temperature of the coolant introduced into the heat conductive member 130 of the battery pack 100 may be relatively low. The second through-hole portion 133 may be a portion through which coolant (such coolant having an increased temperature after heat exchange with the battery modules 110 of the battery pack 100) is discharged from the heat conductive member 130.

The battery module 110 accommodated in the housing 150 will be described with reference to FIG. 4. The battery modules 110 may be aligned in one direction. Each of the battery modules 110 may include a plurality of battery cells 10, each battery cell 10 having a positive electrode terminal 11 and a negative electrode terminal 12. The battery cells 10 may be aligned so that wide surfaces of adjacent battery cells 10 face each other.

The battery cells 10 constituting the battery module 110 may be manufactured by accommodating an electrode assembly and an electrolyte in a battery case and then sealing the battery case having the electrode assembly accommodated therein using a cap plate 14. The electrode assembly may be formed by winding a positive electrode plate, a negative electrode plate, and a separator interposed therebetween. Electrode terminals may be provided to the cap plate 14 so as to be extracted to an exterior of the cap plate 14. The electrode terminals may include the positive electrode terminal 11 connected to the positive electrode plate and the negative electrode terminal 12 connected to the negative electrode plate. The positive and negative electrode plates may generate electrochemical energy through a reaction with the electrolyte. Thus, the generated energy may be transferred to an external load through the positive and negative electrode terminals 11 and 12. A vent 13 may be provided between the positive and negative electrode terminals 11 and 12 so as to serve as a passage through which gas is discharged.

As illustrated in FIGS. 1 to 4, in an implementation, the battery cell 10 may be a prismatic lithium ion secondary battery. However, the embodiments are not limited thereto, and may be applied to various types of batteries including, e.g., a lithium polymer battery, a cylindrical battery, and the like.

The battery module 110 may include a plurality of battery cells 10, a pair of first and second end plates 111 and 112 spaced apart from each other, and connection members 113 and 114 connecting the first and second end plates 111 and 112.

The first and second end plates 111 and 112 may come in surface contact with outermost battery cells 10 so as to compress the plurality of battery cells 10 in inside directions from the outermost battery cells 10, respectively. The connection members 113 and 114 may connect the first and second end plates 111 and 112. First ends of the connection members 113 and 114 may be coupled or fastened with the first end plate 111; and second ends of the connection members 113 and 114 may be coupled or fastened with the second end plate 112. In an implementation, the connection members 113 and 114 may be fastened or coupled with the first and second end plates 111 and 112 by members including, e.g., bolts, nuts, and the like.

The connection members 113 and 114 may connect the first and second end plates 111 and 112, so that it is possible to provide a space in which the plurality of battery cells 10 may be aligned and to support side surfaces and a bottom surface of the battery cell 10. In the present embodiment, as illustrated in FIG. 4, two side connection members 113 may support the side surfaces of the battery cell 10 and one bottom connection member 114 may support the bottom surface of the battery cell 10. However, the embodiments are not limited thereto; and positions and shapes of the connection members 113 and 114 may be variously modified through the design of the battery module 110.

The battery cells 10 may be fixed in a spaced defined by the first and second end plates 111 and 112, the side connection members 113, and the bottom connection member 114. Thus, the battery cells 10 may not be easily moved by external impact. The positive and negative electrode terminals 11 and 12 of neighboring cells 10 may be electrically connected to each other through a bus-bar 15. The bus-bar 15 may include holes through which the positive and negative electrode terminals 11 and 12 pass, respectively. The bus-bar 15 (through which the terminals are connected to each other) may be fixed by a member, e.g., a nut 16.

A barrier 115 may be interposed between neighboring battery cells 10. The barrier 115 may include a spacer (not shown) to space apart the neighboring battery cells 10 from each other and to form a space between the neighboring battery cells 10. Thus, the spacer may provide a flow path for air for cooling the battery cells 10.

According to an embodiment, a battery pack may include a heat conductive member having porous plates and guide members to form a flow path of coolant, so that it is possible to enhance thermal dissipation characteristics using coolant.

Accordingly, cooling efficiency of the battery pack may be improved so that battery cells may not be easily deteriorated, even when they are charged and discharged several times.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
   at least one battery module having a plurality of battery cells aligned in one direction;
   a heat conductive member in contact with bottom surfaces of the battery cells, the heat conductive member including:
      porous plates, the porous plates including a sintered metallic, heat-conductive material having micropores, and
      guide members spaced apart from the porous plates in an interior of the heat conductive member, the guide members defining flow paths for directing coolant between the porous plates; and
   a housing accommodating the at least one battery module and the heat conductive member.

2. The battery pack as claimed in claim 1, wherein the heat conductive member further includes heat conductive plates, the heat conductive plates being alternately disposed between the porous plates.

3. The battery pack as claimed in claim 2, wherein a position of the porous plates corresponds to a position of the at least one battery module.

4. The battery pack as claimed in claim 3, wherein the porous plates are disposed under the at least one battery module.

5. The battery pack as claimed in claim 2, wherein the heat conductive plates include a groove portion therein, the groove portion directing a flow of the coolant between the porous plates.

6. The battery pack as claimed in claim 5, wherein the groove portion is formed in at least one surface of the heat conductive plates, the at least one surface facing the at least one battery module or facing away from the at least one battery module.

7. The battery pack as claimed in claim 1, wherein the heat conductive plate is made of a metallic material.

8. The battery pack as claimed in claim 1, wherein the battery pack includes a plurality of battery modules, the battery modules being accommodated in the housing such that sides of the battery cells of one of the battery modules face sides of the battery cells of another of the battery modules.

9. The battery pack as claimed in claim 1, wherein the heat conductive member further includes at least one through-hole portion.

10. The battery pack as claimed in claim 9, wherein:
    the through-hole portion includes a first through-hole portion and a second through-hole portion, the first through-hole portion is an inlet through which the coolant for cooling the battery cells flows into the heat conductive member, and the second through-hole portion is an outlet through which the coolant in the heat conductive member is discharged to an exterior of the heat conductive member.

11. The battery pack as claimed in claim 10, wherein the first and second through-hole portions are disposed at diagonally opposite ends of the heat conductive member.

12. The battery pack as claimed in claim 10, wherein one end of the second through-hole portion is aligned with an outer edge of the heat conductive member.

13. The battery pack as claimed in claim 1, wherein the coolant is a fluid.

14. A battery pack, comprising:
at least one battery module having a plurality of battery cells aligned in one direction;
a heat conductive member in contact with bottom surfaces of the battery cells, the heat conductive member being formed of a heat conductive material and including:
porous plates, the porous plates including a sintered metallic, heat-conductive material having micro-pores,
heat conductive plates, and
guide members provided in one or more of the heat conductive plates, the guide members being spaced apart from the porous plates in an interior of the heat conductive member, the guide members defining flow paths for directing coolant between the porous plates; and
a housing accommodating the at least one battery module and the heat conductive member.

15. A battery pack, comprising:
at least one battery module having a plurality of battery cells aligned in one direction;
a heat conductive member in contact with bottom surfaces of the battery cells, the heat conductive member including:
porous plates, wherein the porous plates are made of a heat conductive, sintered metallic material having micro-pores,
heat conductive plates, the heat conductive plates being alternately disposed between the porous plates, and
guide members spaced apart from the porous plates in an interior of the heat conductive member, the guide members defining flow paths for directing coolant between the porous plates; and
a housing accommodating the at least one battery module and the heat conductive member.

16. The battery pack as claimed in claim 15, wherein the heat conductive plates are made of a metallic material.

* * * * *